United States Patent [19]
Fukui et al.

[11] Patent Number: 5,964,091
[45] Date of Patent: *Oct. 12, 1999

[54] GAS TURBINE COMBUSTOR AND GAS TURBINE

[75] Inventors: Yutaka Fukui; Tetsuo Kashimura, both of Hitachi; Hideyo Kodama, Hitachinaka; Hiroyuki Doi, Tokai-mura; Ryo Hiraga, Hitachioota, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/679,398

[22] Filed: Jul. 9, 1996

[30] Foreign Application Priority Data

Jul. 11, 1995 [JP] Japan ..................... 7-174620

[51] Int. Cl.⁶ ........................................ F02C 1/00
[52] U.S. Cl. ............... 60/752; 60/902; 420/436
[58] Field of Search ................ 60/752, 902; 148/408, 148/425; 420/436, 438, 439

[56] References Cited

U.S. PATENT DOCUMENTS

| | | | |
|---|---|---|---|
| 3,592,638 | 7/1971 | Freeman, Jr. .................. | 148/408 |
| 3,802,934 | 4/1974 | Augustine, Jr. et al. ........ | 148/408 |
| 4,039,330 | 8/1977 | Shaw . | |
| 4,566,280 | 1/1986 | Burr . | |
| 4,621,499 | 11/1986 | Mori et al. .................. | 60/752 |
| 4,708,750 | 11/1987 | Field et al. ................. | 148/11.5 N |
| 4,789,412 | 12/1988 | Nakamura et al. ............. | 148/408 |
| 4,850,187 | 7/1989 | Siga et al. .................. | 60/909 |
| 4,938,805 | 7/1990 | Haydon et al. ............... | 148/408 |
| 5,002,731 | 3/1991 | Crook et al. ................ | 148/425 |
| 5,017,249 | 5/1991 | Smith et al. ................ | 148/410 |
| 5,370,497 | 12/1994 | Doi et al. . | |
| 5,413,647 | 5/1995 | Ablett et al. . | |
| 5,428,953 | 7/1995 | Siga et al. ................. | 60/909 |

FOREIGN PATENT DOCUMENTS

| | | |
|---|---|---|
| A637476 | 2/1995 | European Pat. Off. . |
| 61-174385 | 8/1986 | Japan . |
| 62-53583 | 11/1987 | Japan . |

OTHER PUBLICATIONS

Journal of Engineering for Gas Turbines and Power, vol. 110, Jan. 1988, "Centrispun High Alloy Steel Castings for Gas Turbine Applications", P.G. Nixon, pp. 132–141.

*Primary Examiner*—Charles G. Freay
*Attorney, Agent, or Firm*—Fay, Sharpe, Beall, Fagan, Minnich & McKee

[57] ABSTRACT

A cylindrical gas turbine combustor, burning injected fuel and guiding the combustion gas to turbine nozzles, includes a cylindrical portion such as a combustor liner and a transition piece, exposed to the combustion gas, which is made of austenitic Fe base casting alloy, Ni base casting alloy or Co base casting alloy.

13 Claims, 11 Drawing Sheets

GAS TURBINE COMBUSTOR AND GAS TURBINE

BACKGROUND OF THE INVENTION

The present invention relates to a noble gas turbine combustor and, particularly, to a gas turbine combustor of Fe base casting alloy, Ni base casting alloy or Co base casting alloy, each of which has an excellent property against thermal fatigue, and a gas turbine employing the combustor.

A gas turbine combustor is made by cold forming of a plate, so that the plate is necessary to be made of an alloy which is excellent in hot working for forming a plate and in cold working for forming the combustor. Further, since the gas turbine combustor receives repeated heating and cooling by combustion gas of high temperature, it should be an alloy which has an excellent property against thermal fatigue.

The present inventors found that the larger the reduction of area in tensile property at room temperature is, the better the cold workability of an alloy is, and the larger the tensile proof strength, the reduction of area in tensile property and the creep rupture strength at high temperature are, the better the property against thermal fatigue becomes.

In conventional gas turbine combustors, Hastelloy X (0.1C-22Cr-9Mo-0.5W-1Co-19Fe-balance Ni) is used. However, in recent years, in order to improve the performance of gas turbines, combustion gas temperature tends to be raised. Therefore, the combustion gas temperature becomes higher than a heating temperature of the combustor liner. Hitherto, although the heating temperature of the combustion liner was less than 800° C., it now exceeds 800° C. Therefore, a sufficient property against thermal fatigue is not attained by the conventional Hastelloy X which has been used.

Since this alloy contains a lot of Mo, use of it for long time at a high temperature higher than 800° C. precipitates a lot of brittle phase (inter metallic compound) and lowers remarkably the ductility of the alloy, whereby the alloy has such a defect that the property against thermal fatigue is low.

In the gas turbine combustor, fuel injected from a fuel nozzle is introduced into a combustion liner through a cap to be burnt there and the combustion gas is guided into turbine nozzles and blades through a transition piece. In the gas turbine combustor, the above-mentioned cap, liner and transition piece are exposed to high temperatures. Therefore, a heat resisting alloy is used for those structural members as mentioned above. In particular, since louver holes each are provided with sharp notches at both ends thereof, the louver hole portions are subjected to heat cycles of rapid heating and rapid cooling. Further, stress concentration occurs at their notch portions, so that cracks due to thermal fatigue are apt to occur at the notch portions in a case where an alloy which is easy to suffer heat embrittlement is used.

In order to improve power generation efficiency of a gas turbine power plant, a technique to use the gas turbine at high temperature is being studied. As the gas turbine is used at high temperature, it is desired to improve endurance temperature of parts of the gas turbine. By development of Ni base alloy, Co base alloy, etc. the endurance temperature of those heat resisting alloy have been raised. However, the endurance temperature is about 850° C. at most at present.

On the other hand, ceramic material is more excellent in heat resistance than metal material. However, in a case where the ceramic material is used as the structural material, there is a problem of toughness, etc. Therefore, in order to meet the parts raised to high temperature, a lot of studies of methods in which the parts do not reach a high temperature have been conducted. As one of those methods, a study has been made of a method of cooling the parts. Further, as another method, there is a method of coating surfaces of metal members with ceramics of small thermal conductivity. Such coating is called a thermal barrier coating (hereunder, referred to as TBC). TBC is used, combined with various cooling methods, whereby the effect becomes larger. As an example, there is a report that temperature of a metal member which is a base member can be reduced by 50–100° C. as compared with a metal member on which TBC is not applied. By using such a method, the reliability of structural members of high temperature gas turbines, etc. can be raised. On the other hand, there are technical problems of TBC such as adherence mechanism between a base material and a ceramic coating layer and reliability thereof since TBC combines a base material of heat resisting alloy and a ceramic coating layer which is different in values representative of physical properties. In particular, in gas turbines, etc. damages occur such as separation of the ceramic coating layer by thermal cycle due to starting and stoppage of the gas turbine.

Combustor linear material is disclosed in JP B 62-53583 and TBC thereof is disclosed in JP A 61-174385.

Operation temperature of gas turbines is increasing year by year as the efficiency of the gas turbines are made higher. In combustors also, it progresses to make the temperature higher, and material used therefor also is desired to be excellent in high temperature strength. However, current combustors each are produced by bending a rolled plate into a cylindrical shape and welding it. Since the rolled plate has small grain size, the creep strength at high temperature is low. Further, since cracks may occur during forging or rolling, it was impossible to add a lot of alloy components for strengthening the material of the rolled plate. Therefore, the upper limit temperature in practice has been 800° C. Further, since the cylinder is produced by bending the rolled plate and welding it, the strength of the welded portion is lowered.

Even if TBC is utilized in order to prevent base metal temperature of gas turbine parts from becoming higher and reduce the temperature, the parts in which conventional TBC is utilized are impossible to sufficiently reduce the base metal temperature of the parts since the TBC is low in durability at high temperature.

An object of the present invention is to provide a gas turbine combustor and a gas turbine employing the combustor, in which an alloy having a high property against thermal fatigue at a higher temperature is used. In particular, an object of the present invention is to provide a gas turbine combustor and a gas turbine employing the combustor, in which an alloy having a creep rupture strength at 850° C. for $10^4$ hours is 3 kg/mm$^2$ or more is used.

Another object of the present invention is to provide a gas turbine combustor and a gas turbine, each of which has a thermal barrier coating (TBC) in which a joining force between a ceramic material and a base plate is stable for a long time and cracks and separation do not easily occur.

The present invention resides in a gas turbine combustor employing a combustor liner and a transition piece each of which is made cylindrical by casting without welding.

The combustor liner is made by precision casting or centrifugal casting and the transition piece is made by precision casting. The combustor liner has straight inner and outer peripheral surfaces. In particular, it is preferable to provide ring-shaped projections each peripherally extending on the outer peripheral surface for increasing cooling and its strength.

As material according to the present invention, any one of an Fe base casting alloy, Ni base casting alloy and Co base casting alloy is used. The Co base casting alloy comprises, by weight, 0.04–1.0% C, at most 1% Si, at most 2% Mn, 15–35% Cr, 0.5–20% W, at most 30% Ni and 35–60% Co, and it is preferable to contain at most 3% of at least one kind of MC type carbide forming elements such as Ti, Zr, Hf, V. In particular, preferable is an alloy including by weight 0.04–0.15% C, at most 1% Si, at most 2% Mn, 5–25% Ni, 20–30% Cr and 5–16% W, or an alloy including, in addition to the above elements, at least one element of 0.1–0.35% of Ti, Nb and Zr.

The Fe base casting alloy comprises by weight 0.04–1.0% C, at most 2% Si, at most 3% Mn, 15–35% Cr, 10–30% Ni, 30–50% Fe, and it is preferable to include further at most 3.0%, preferably, 0.1–1% of at least one element of the MC type carbide forming elements as mentioned above. In particular, preferable is a Fe base casting alloy comprising by weight 0.15–0.6% C, 0.5–2.0% Si, 0.5–3% Mn, 15–30% Ni, 20–30% Cr, 0.10–0.30% Ti and 0.10–0.35% Nb.

The Ni base casting alloy comprises by weight 0.04–0.5% C, at most 1% Si, at most 2% Mn, 15–35% Cr, 15–30% Co, at most 10% of at least one kind of W and Mo, 0.1–10% Ti, 0.1–5% Al and 35–55% Ni, and it is preferable for the alloy to include further at most 2% of at least one element of Ta, Nb, V, Hf and Zr. In particular, preferable is a Ni base casting alloy comprising by weight 0.05–0.15% C, at most 1% Si, at most 2% Mn, 20–30% Cr, 15–25% Co, 4–10% W, 1.5–3.5% Ti and 1.0–2.5% Al. In those alloys according to the present invention, it is preferable to make grain size equal to or larger than 100 $\mu$m, preferably equal to or larger than 300 $\mu$m in order to increase high temperature strength. Further, in order to prevent the strength of welding portions from lowering, it is necessary to make a cylindrical member without welding. In order to solve this, the cylindrical member is manufactured by centrifugal casting or lost wax precision casting. By casting it, a cylindrical member which has large grain size and no welding portion can be attained.

The present invention resides in a cylindrical gas turbine combustor burning injected fuel and leading the combustion gas into turbine nozzles, the inner cylindrical tube of the above-mentioned combustor being made of casting alloy comprising, by weight, 0.04–0.15% C, at most 1% Si, at most 2% Mn, 15–35% Cr and 0.5–20% W, or further including 15–40% Co, 0.1–5% Al, 0.1–5% Ti and 0.001–0.1% B, and bal. Ni of 20% or more, the casting alloy being Ni base casting alloy having substantially all austenitic phase. Further, it is preferable for the present invention to include, in the above-mentioned alloy, at least one selected from a group consisting of at most 0.5% rare earth metal, at most 3% Nb, at most 0.1% Mg and at most 0.5% Zr. In particular, 0.1–2% Al, 0.1–2% Ti and rare earth element 0.005–0.5% are preferable.

The present invention resides in a gas turbine which comprises a compressor, a combustor for producing combustion gas, using air compressed by the compressor and a turbine driven by the combustion gas and which is characterized in that a cylindrical portion of the combustor exposed to the combustion gas is made of austenitic Fe base casting alloy, Ni base casting alloy or Co base casting alloy.

Further, the present invention is characterized in that a compression ratio of the air is 15–20 and the temperature of the air is 350° C. or more, the cylindrical portion of the combustor exposed to the combustion gas is provided with projections for cooling at its outer periphery and the outer peripheral portion is cooled by the compressed air so that its metal temperature becomes 800–900° C., and the temperature of the combustion gas at an outlet of the combustor is 1400° C. or more.

Further, the present invention is characterized in that a compression ratio of the air is 15–20 and the temperature of the air is 350° C. or more, the outer peripheral portions of a combustor liner and a transition piece are cooled by the compressed air so that the metal temperature of the combustor liner and the transition piece, exposed to the combustion gas becomes 800–900° C., the peripheral portion of the combustor liner is provided with projections for cooling, and the temperature of the combustion gas is 1400° C. or more at an outlet of the combustor.

In the present invention, in a gas turbine which comprises a compressor having blades and static blades of at least 12 stages, and a turbine, integrated with the compressor and rotated at a high speed by combustion gas generated in a combustor, the compressor can be a compressor in which blades are formed in a rotor to be one piece as a whole, a compressor which has at least 12 stage blades planted on a rotor divided into a plurality of rotor pieces, at least 6 stage blades being planted on one rotor piece and each of the other rotor pieces having at most 3 stage blades planted thereon, or a compressor in which blades in each of the at least 12 stages are formed on one disc.

Further, in the present invention, as rotor material for the compressor, it is preferable to use Ni—Cr—Mo—V low alloy steel comprising by weight 0.15–0.40% C, at most 0.1% Si, at most 0.5% Mn, 1.5–2.5% Ni, 0.8–2.5% Cr, 0.8–2.0% Mo, 0.1–0.35% V and balance Fe and having full bainitic structure, for the one piece rotor, the rotor having each disc having stage blades, and the rotor in which blades are planted on divided rotor pieces. The above low alloy steel is further characterized by further including 0.0–0.1% of at least one kind of Nb and Ta.

Further, in a split rotor type compressor according to the present invention, the rotor divided into 6 rotor pieces on which at least 15 stage blades are mounted is preferable to be such that every 2 stage blades of blades from the first stage to the 8th stage are mounted on each rotor piece and every at least 3 stage blades of the 9th stage and the other stages are mounted on each of the other rotor pieces.

Compressor blades of the first stage and, if necessary, at least one stage from the 2nd stage to the 5th stage are preferable to be made of Ti alloy, and blades from the 2nd stage to the final stage are preferable to be made of martensitic stainless steel except for the blades of Ti alloy.

The present invention resides in a combined power generation system which is provided with a gas turbine, driven to rotate by combustion gas and a steam turbine, driven to rotate by steam generated in a waste heat recovery boiler recovering the heat of exhaust combustion gas from the gas turbine, and generates power by rotation of the gas turbine and the steam turbine, and which is characterized in that a combustor liner of the gas turbine is a casting of alloy selected from Fe base alloy, Ni base alloy and Co base alloy, a compression ratio of air compressed by a compressor is 15–20 and the temperature of the air is 400° C. or more, a combustor outlet temperature of the combustion gas is 1400° C. or more, the temperature of the combustion gas is 550–600° C., and the steam turbine has a high and low pressure section integrated rotor shaft, the steam temperature being 530° C. or more and thermal efficiency being 46% or more and/or the output thereof being 600 kW/(kg/S) or more.

Further, the present invention resides in a combined power generation system which has a gas turbine driven to rotate by combustion gas, and a steam turbine driven to rotate by steam generated in a waste heat recovery boiler recovering the heat of exhaust combustion gas from the gas turbine, and generates power by rotation of the gas turbine and the steam turbine, and which is characterized in that a combustor liner of the gas turbine is a casting of alloy selected from Fe base alloy, Ni base alloy and Co base alloy, a compressor of 15–20 stage blades is provided, the compression ratio of air compressed by the compressor is 15–20 and the temperature of the air is 400° C. or more, the gas turbine has at least 3 stages, a combustor outlet temperature of the combustion gas is 1400° C. or more, the temperature of the combustion gas is 550–600° C. at an inlet of the waste heat recovery boiler and 130° C. or less at an outlet of the boiler, and the steam turbine has blades planted on a high and low pressure section integrated rotor shaft, the final stage of the blades being 30 inches or more at a blade portion, the steam temperature being 530° C. or more at a high pressure side inlet of the steam turbine and 100° C. or less at a low pressure side outlet.

In the present invention, a combustor cylindrical liner and a transition piece are made of Fe base alloy, Ni base alloy or Co base alloy. By forming them by casting, high strength is attained. Further, since the cylindrical liner body has no welded portion, a strength decrease at the welded portion can be prevented. Since in the gas turbine combustor, the combustion gas temperature has been raised, exceeding 1300° C., and becoming 1400° C. and even 1500° C., the combustor itself has been raised in temperature according to the elevation of the combustion gas temperature. Therefore, material of higher strength at a higher temperature is desired whereby it is possible to provide a structure having no welded portion in the barrel portion, and a structure thickened to 2 mm or less of the thickness and having no cooling hole is possible, whereby it is possible to reduce an amount of air used for cooling and improve the thermal efficiency.

C is contained in the amount of 0.04% or more in order to precipitate carbides during use at high temperature and raise proof strength and creep strength at high temperature. However, when C exceeds 1.0%, precipitation of carbides during use at high temperature is remarkable and reduction of area in tensile property at high temperature is lowered. In Co base alloy and Fe base alloy, it is preferable to be 0.04–1.0%, and 0.04–0.5% in Ni base alloy. In particular, it is preferable to be 0.05–0.2% in Ni base alloy, 0.15–0.35% in Fe base alloy and 0.15–0.35% in Co base alloy.

Cr effects solid solution into alloy and raises proof strength at a high temperature and creep strength. It is necessary to include at least 15% of the Cr in order to raise high temperature oxidation resistance and sulfidation corrosion resistance further. However, when Cr exceeds 35%, sigma phases precipitate and reduction of area in high temperature tensile test decreases. In particular, 18–30% is preferable in any case, and a more preferable range of Cr is 20–26%.

W, which is effective in Co base alloy and Ni base alloy, effects solid solution into alloy and raises remarkably the proof strength at high temperature. Further, creep rupture strength also is raised remarkably. However, when Cr exceeds 20% in Co base alloy and 10% in Ni base alloy, to the contrary, the proof strength is remarkably lowered. Further, cold workability and reduction of area in tensile property at high temperature are lowered, the latter because of precipitation of sigma phase. A preferable range of W is 5–16% in Co base alloy and 4–10% in Ni base alloy. Ni base alloy can contain W and Mo of equal amount, and it is preferable to contain the above-mentioned contents in total.

Co effects solid solution into Fe base alloy and Ni base alloy, and raises remarkably creep rupture strength at room temperature and a high temperature. However, when Co exceeds 30%, ductility at high temperature is lowered rapidly, whereby the reduction of area in tensile property at high temperature decreases. A preferable upper limit is 25%.

Al effects solid solution into alloy by addition of 0.1–5% to Fe base or Ni base alloy, and precipitates gamma prime phase during aging heat treatment at high temperature, thereby to raise tensile proof strength at high temperature and creep rupture strength. A preferable range is 1.0–2.5% Ni base alloy.

Addition of Ti, Zr, Hf or Nb of at most 3% to Fe or Co base alloy and 0.1–10% to Ni base alloy effects solid solution thereof into alloy, or precipitates gamma prime phase during aging heat treatment at high temperature to increase tensile proof strength at high temperature and creep rupture strength. However, when an addition amount exceeds 3% to Fe or Co base alloy, 10% to Ni base alloy, reduction of area in tensile property at high temperature decreases. A preferable range is 0.1–1.5% and more preferable 0.10–0.35% in Fe or Co base alloy, and 1.5–3.5% in Ni base alloy.

Fe is included upon addition of alloy elements in Ni base or Co base alloy. However, since it lowers creep rupture strength, it is better to reduce its content to the utmost. Even if it is contained, it is preferable to be 2% or less. At most 1% is preferable and at most 0.2% is more preferable.

Si and Mn are added as a deoxidizer. At most 2%, preferably at most 1.0% Si and at most 3%, preferably at most 2% Mn are added. However, addition exceeding the above-mentioned amounts lowers creep rupture strength, so that at most 2% Si and at most 3% Mn are added. In particular, addition of 0.2–0.6% Si and 0.4–1.0% Mn is preferable in any alloys of them.

B is segregated in austenitic grain boundaries by addition of a very small amount to increase creep rupture strength and ductility at high temperature. The effect is attained by addition of 0.001% or more, and when it exceeds 0.1%, hot workability and high temperature ductility are lowered. Therefore, 0.001–0.1% is preferable.

Mg and rare earth elements segregate in austenitic grain boundary to raise creep rupture strength. Further, Zr is a strong carbide former element, and addition of a small amount forms other carbides, for example, Ti carbide, etc. and increases creep rupture strength by multiplier action. However, the addition of an excessive amount of those elements decreases binding force of grain boundary and forms bulky carbide, whereby high temperature ductility decreases. Therefore, at most 0.1% Mg and at most 0.5% rare earth element, and in particular, 0.005–0.05% Mg and 0.005–0.1% rare earth element are preferable. The thickness of the combustor liner wall is preferable to be 1.0–5.0 mm, and more preferable to be 1.5–3.0 mm. The height of ring-shaped projections provided on the outer periphery of the combustor liner to strengthen the liner is preferable to be 1.0–3.0 mm. Total dimension of the thickness of the combustor liner and the height of the projections is preferable to be 4.0–6.0 mm. The thickness of the transition piece is preferable to be 2.0–7.0 mm and more preferable to be 3–5 mm. Further, the combustor liner is preferable to take such a construction that cooling of the liner by cooling air is carried out mainly only on the outer peripheral surface to increase the thermal efficiency.

In the present invention, it is preferable to provide, on the base material of the casting alloy having at least one kind of the above-mentioned Ni, Co and Fe as a main component, an alloy layer comprising at least one of Fe, Ni and Co as a main component, and Cr and Al and being more excellent in high temperature oxidation resistance and hot corrosion resistance than the above-mentioned base material, and a coating layer of ceramics having $ZrO_2$ on the above-mentioned alloy layer, and form an oxide layer having Al as a main component on the boundary between the above-mentioned alloy layer and the above-mentioned ceramic coating layer. It is preferable that material constituting the above-mentioned ceramic coating layer includes $ZrO_2$ as a main component, and at least one element having 5–10 wt % in total CaO, MgO and $Y_2O_3$, and an alloy forming the above-mentioned alloy layer includes at least one of Fe, Co and Ni as a main component, 10–30 wt % Cr and 5–30 wt % Al, or further in addition thereto includes 0.1–5 wt % of at least one element of Hf, Ta, Y, Si and Zr. The ceramic coating layer is preferable to be 0.1–0.8 mm and the alloy layer 0.01–0.2 mm.

DESCRIPTION OF THE EMBODIMENTS OF THE INVENTION

Embodiment 1

Table 1 shows chemical compositions (wt %) of material used. Material 1 is a comparative material which is used for combustors by bending after rolling and then welding to form a cylindrical member. Grain size is made very fine because of rolled material and is about 80 μm. Material Nos. 2–5 each are material made by a method according to the present invention.

TABLE 1

| No | Average Grain Size | C | Cr | Ni | Co | Fe | W | Ti | Nb | Zr | Al |
|---|---|---|---|---|---|---|---|---|---|---|---|
| 1 | 0.08 mm | 0.06 | 22.28 | 22.30 | bal. | — | 14.20 | — | — | — | — |
| 2 | 0.50 mm | 0.07 | 22.35 | 22.13 | bal. | — | 14.31 | — | — | — | — |
| 3 | 1.00 mm | 0.25 | 29.65 | 10.83 | bal. | — | 7.10 | — | — | — | — |
| 4 | 3.00 mm | 0.35 | 29.38 | 10.36 | bal. | — | 7.32 | 0.25 | 0.27 | 0.15 | — |
| 5 | 1.50 mm | 0.10 | 22.90 | bal. | 21.21 | — | 7.0 | 2.70 | — | — | 1.60 |
| 6 | 4.5 mm | 0.39 | 25.98 | 34.58 | — | bal. | — | 0.18 | 0.23 | Si 1.10 | Mn 1.03 |

Figure 1:
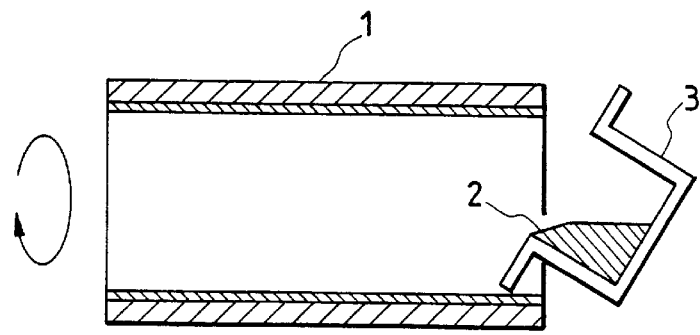
FIG. 1 is a sectional view of a casting apparatus showing a centrifugal casting method.

A casting mold 1 as shown in FIG. 1 is rotated at about 800 rpm, molten metal 2 prepared in a ladle 3 in a other way is poured into the casting mold 1, and solidified to form a cylindrical member. Although various sized cylindrical members having various diameter, thickness and length according to rpm, capacity and casting mold size can be obtained, here, a cylinder of outer diameter 230 mm×inner diameter 220 mm×length 500 mm was made. The structure of material of the cylinder was dendritic structure, presented equiaxial grain or columnar grain, having eutectic carbides. The grain size was large, and it was 0.5–3.0 mm. After the centrifugal casting, it was machined, whereby a combustor liner as shown in FIG. 2 was obtained.

Figure 2:
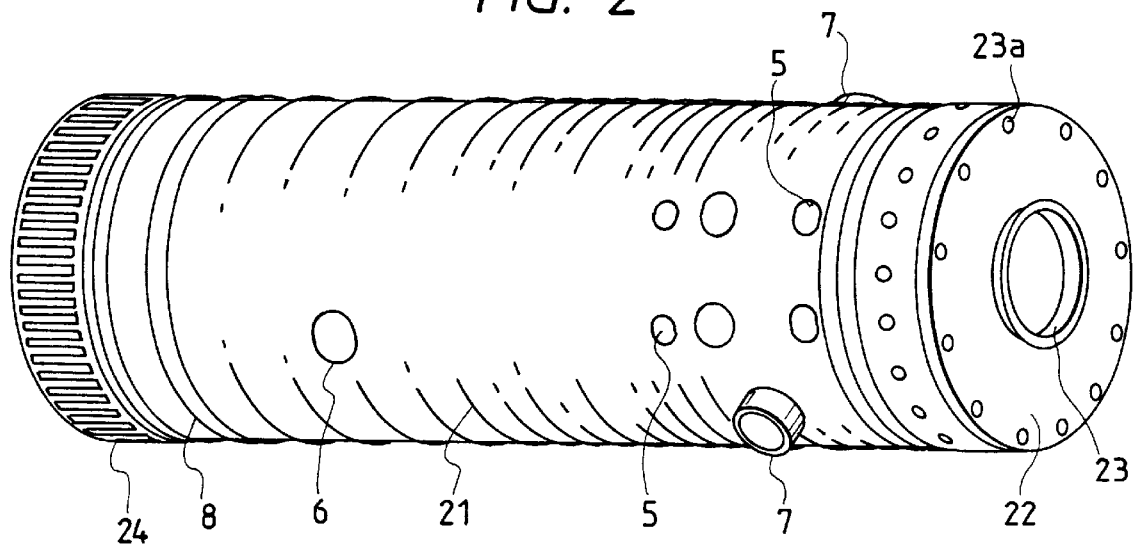
FIG. 2 is a perspective view of a gas turbine combustor inner cylinder.

FIG. 2 is a perspective view of the combustor liner of a gas turbine combustor which was made. The basic shape of the combustor liner is cylindrical and the inside thereof forms a combustion chamber isolated from compression air flowing at the outside thereof. A nozzle cap 22 for mounting a fuel nozzle (not shown) is fixedly inserted in one opening end of a liner sleeve constituting the above-mentioned combustor liner. A fuel nozzle collar 23 is provided at the center of the nozzle cap 22, and a plurality of combustion air holes 23a are formed in an outer peripheral portion of the nozzle collar 23. A spring seal 24 for connecting a transition piece (not shown) leading combustion gas into turbine nozzles is fixedly inserted on the other opening end of the liner sleeve. Further, mixing air holes 5, dilution air holes 6, crossfire tube collar 7, ring-shaped projections 8 for cooling, etc. are provided in the peripheral surface of the liner sleeve. In the figure, the projections 8 are shown only at both end portions of the cylindrical member and not shown at the middle portion therebetween. The combustor liner is secured to a combustor outer cylinder (not shown) through a liner stop mounted on the nozzle cap 22.

In the present embodiment, any casting alloys are as they are cast. The castings each are a straight pipe at inner and outer sides when cast, and a lot of ring-shaped projections 8 are formed on an outer surface of each casting by machining. The projections 8 raise cooling efficiency by cooling air blowing on the outer surface. The thickness of the inner cylinder is about 3 mm, total thickness including the projections is about 5 mm. In this embodiment, a combustor is made so that combustion gas temperature is about 1400° C. or more at the combustor outlet, and it is cooled by compressed air which is compressed by the compressor to be a compression ratio of 15–20 and temperature of at least 400° C. so that the metal temperature of the combustor liner will be 800–900° C. In this embodiment, as described later, the combustor is made of a casting having high strength. Therefore, the metal temperature can be made high and as a result, cooling air flow can be limited to the outer peripheral portion, and the thermal efficiency can be raised.

Figure 3:
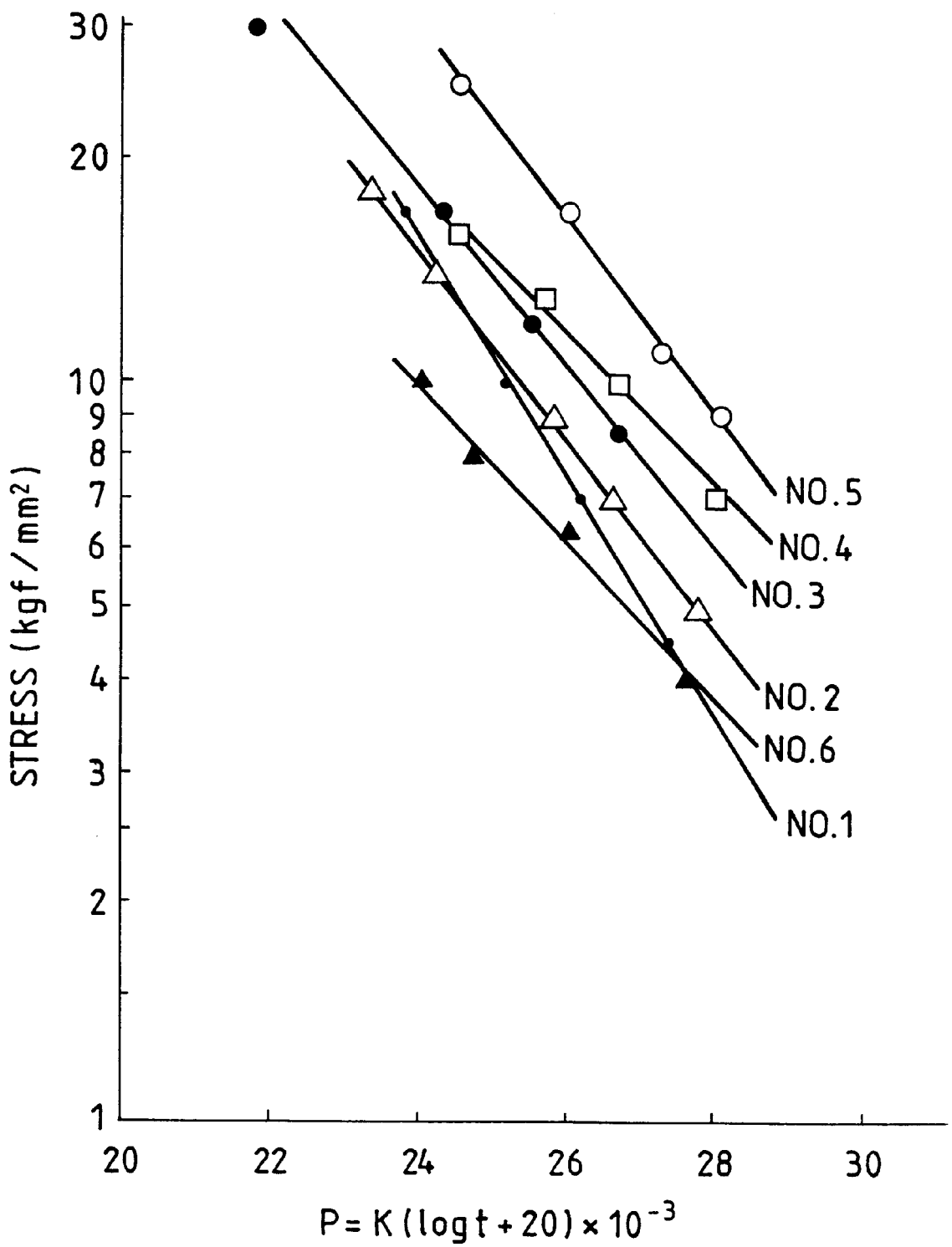
FIG. 3 is a diagram showing a relation between stress and parameter P.

FIG. 3 is a diagram showing creep rupture strength at 800–982° C. for 100–5000 h of the casting alloys obtained.

Comparing Nos.1 and 2, although the chemical components are the same, the casting alloy 2 has larger creep rupture strength. Further, since there is no probability of forging crack in the casting alloy, No.3 alloy including much C, No.5 alloy-including Ti, Al and No.4 including Ti, Nb, Zr each represent excellent high temperature strength.

The casting alloys according to the present invention have a high creep rupture strength of 800° C., 100,000 hours (P=26.8×10³), that is, it is 5 kg/mm² or more.

Figure 4:
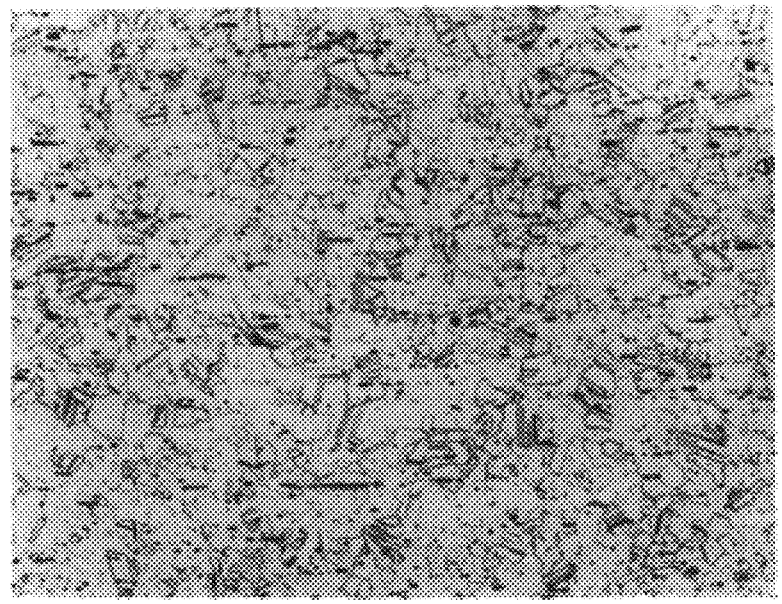
FIG. 4 is a microscopic picture showing a metal structure.
Figure 5:
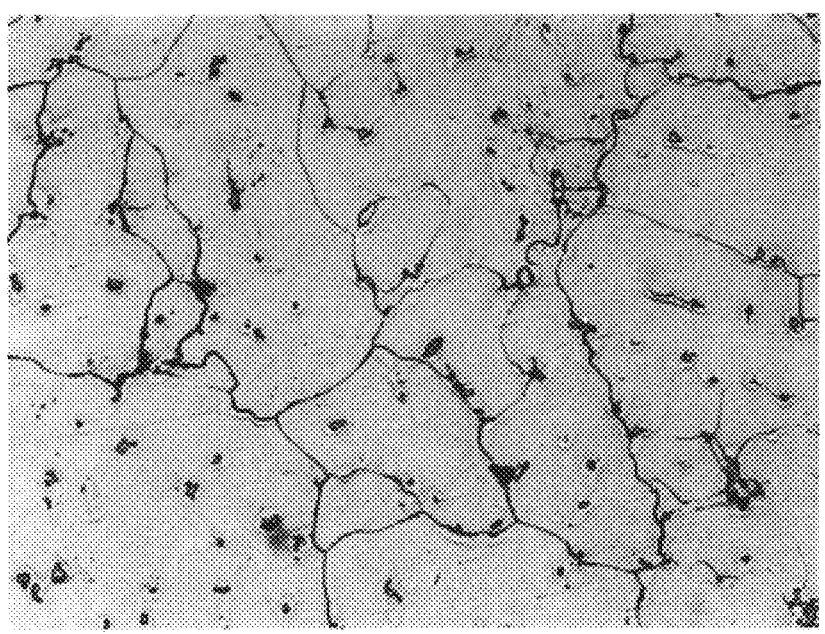
FIG. 5 is a microscopic picture showing a metal structure.
Figure 6:
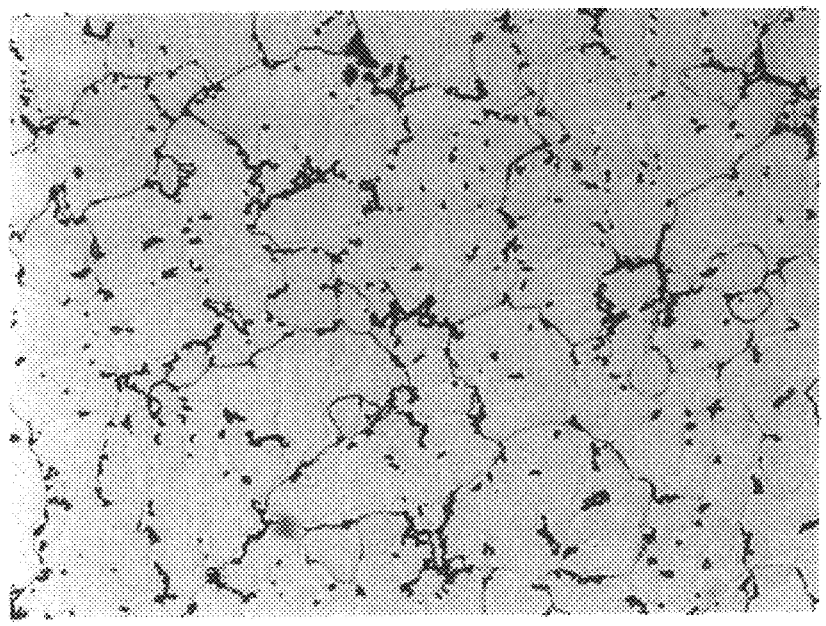
FIG. 6 is a microscopic picture showing a metal structure.
Figure 7:
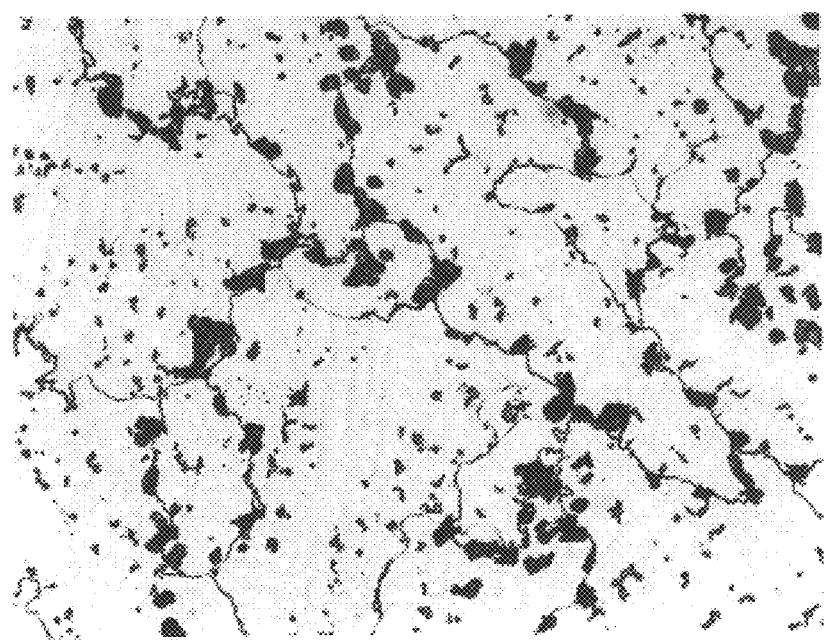
FIG. 7 is a microscopic picture showing a metal structure.
Figure 8:
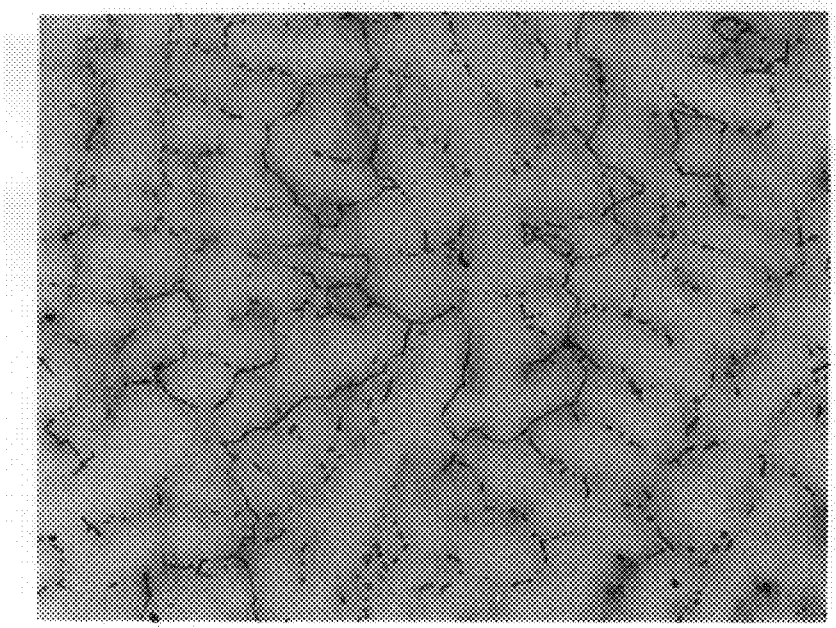
FIG. 8 is a microscopic picture showing a metal structure.
Figure 9:
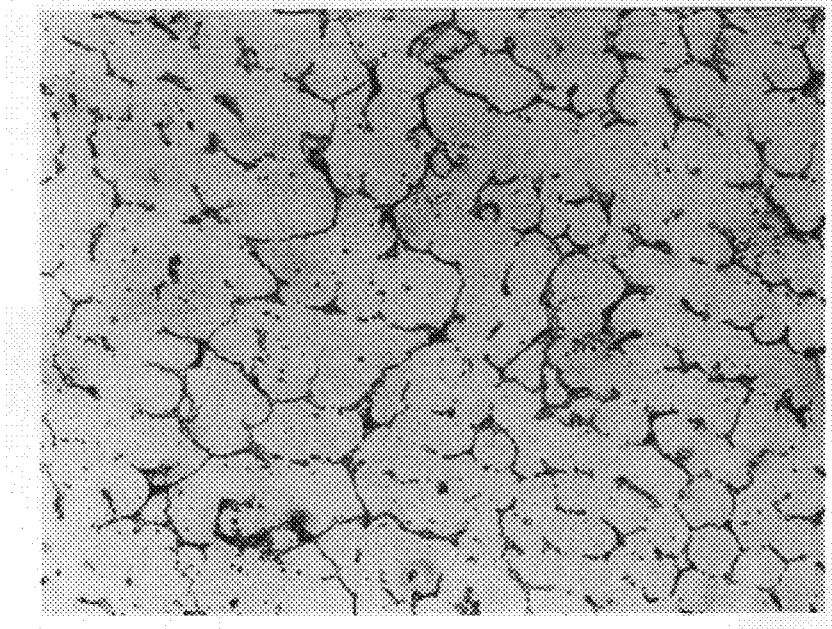
FIG. 9 is a microscopic picture showing a metal structure.

FIGS. 4–9 are microscopic pictures showing metal structures of material Nos. 1–6, respectively, each amplified 100 times. Material No.1 shown in FIG. 4 is forged material, materials No.2, No.3, No.4, No.5 and No.6 are shown in FIGS. 5, 6, 7, 8 and 9, respectively. The materials of Nos. 2–6 each are structure as it is cast. As shown in the figures, the alloy materials according to the present invention each have structure in which eutictic carbides or intermetallic compounds appear.

Figure 10:
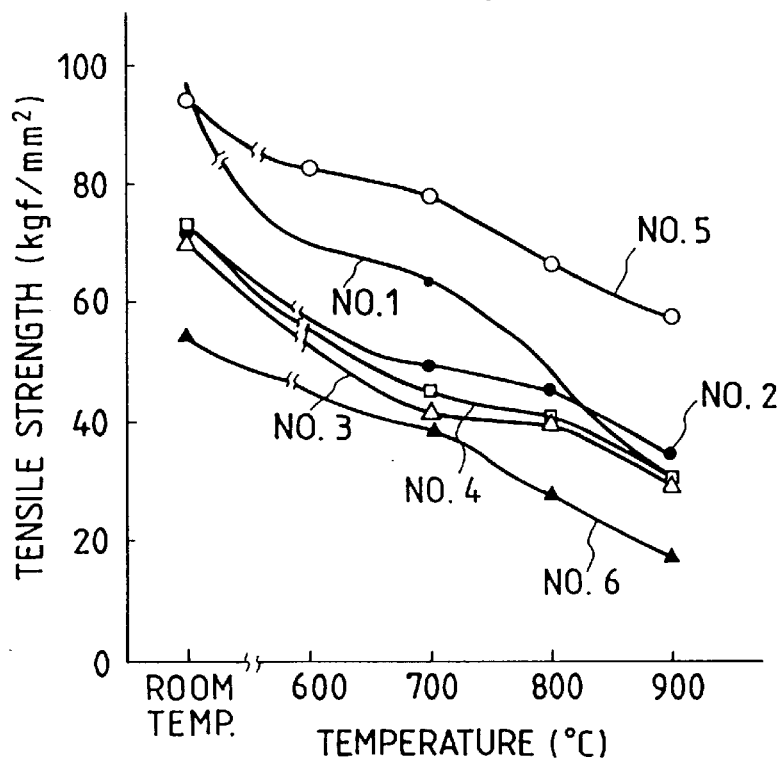
FIG. 10 is a diagram showing a relation between tensile strength and temperature.

FIG. 10 is a diagram showing a relation between tensile strength and temperature. As shown in the figure, in a high temperature region of 800° C. or more, the forged material of No.1 decreases rapidly in tensile strength. On the other hand, the materials according to the present invention each are small in decrease and have a high value. These materials have 25 kg/mm² or more at temperature of 800° C. and 15 kg/mm² or more at temperature of 900° C.

Figure 11:
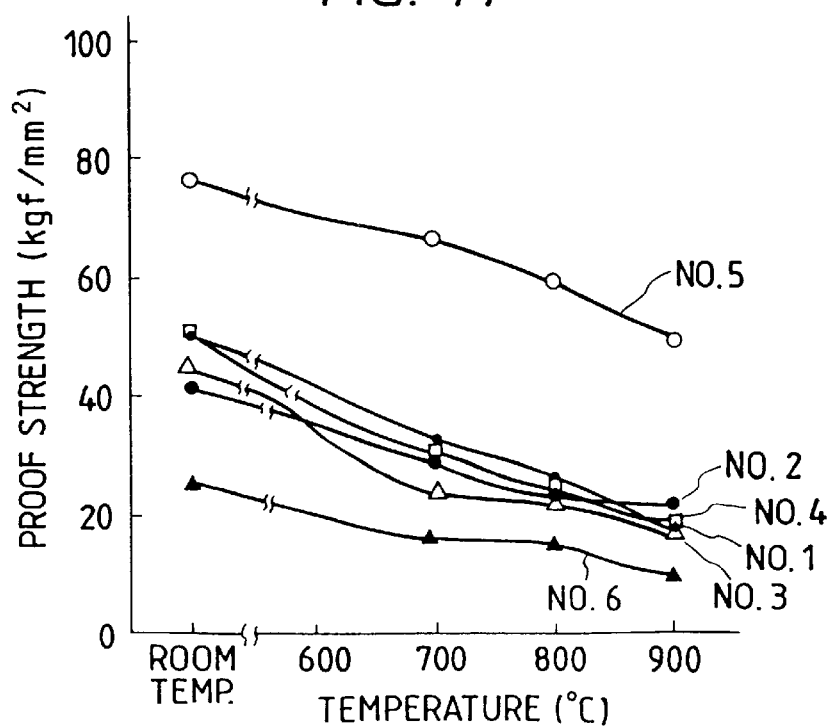
FIG. 11 is a diagram showing a relation between proof strength and temperature.

FIG. 11 shows a relation between proof strength and temperature, in which material of No. 5 has high values such as about 60 kg/mm² at temperature of 800° C. and about 50 kg/mm² at temperature of 900° C. The other materials except for the material of No. 6 have 25 kg/mm² or more at temperature of 800° C. and about 20 kg/mm² at temperature of 900° C., and the material of No. 6 has about 15 kg/mm² at temperature of 800° C. and about 10 kg/mm² at temperature of 900° C. They have sufficient strength.

Figure 12:
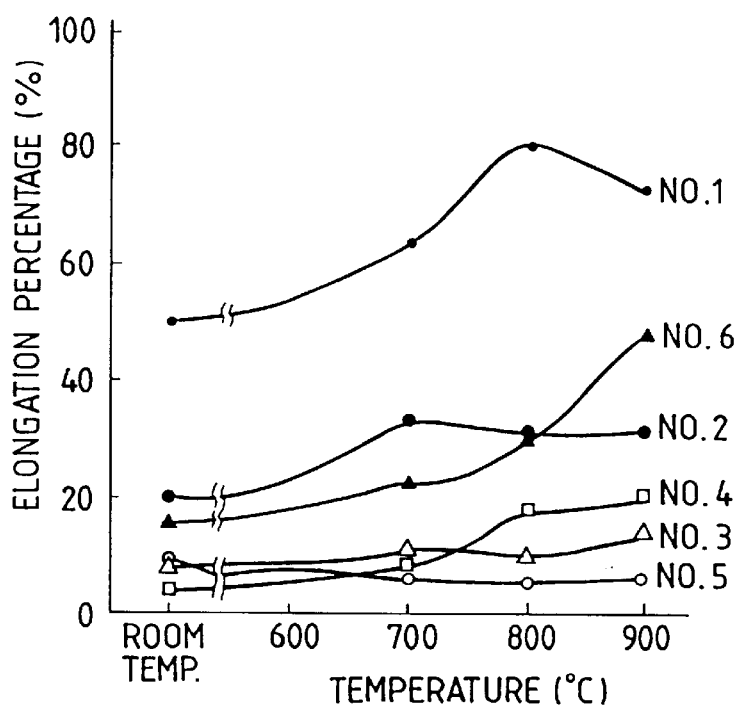
FIG. 12 is a diagram showing a relation between elongation percentage and temperature.

FIG. 12 is a diagram showing a relationship between elongation percentage and temperature. The forged material of No.1 has a high elongation percentage. On the other hand, the cast alloy materials according to the present invention are lower than the forged material. However, they have an elongation percentage of 5% or more which is sufficient in practice.

Figure 13:
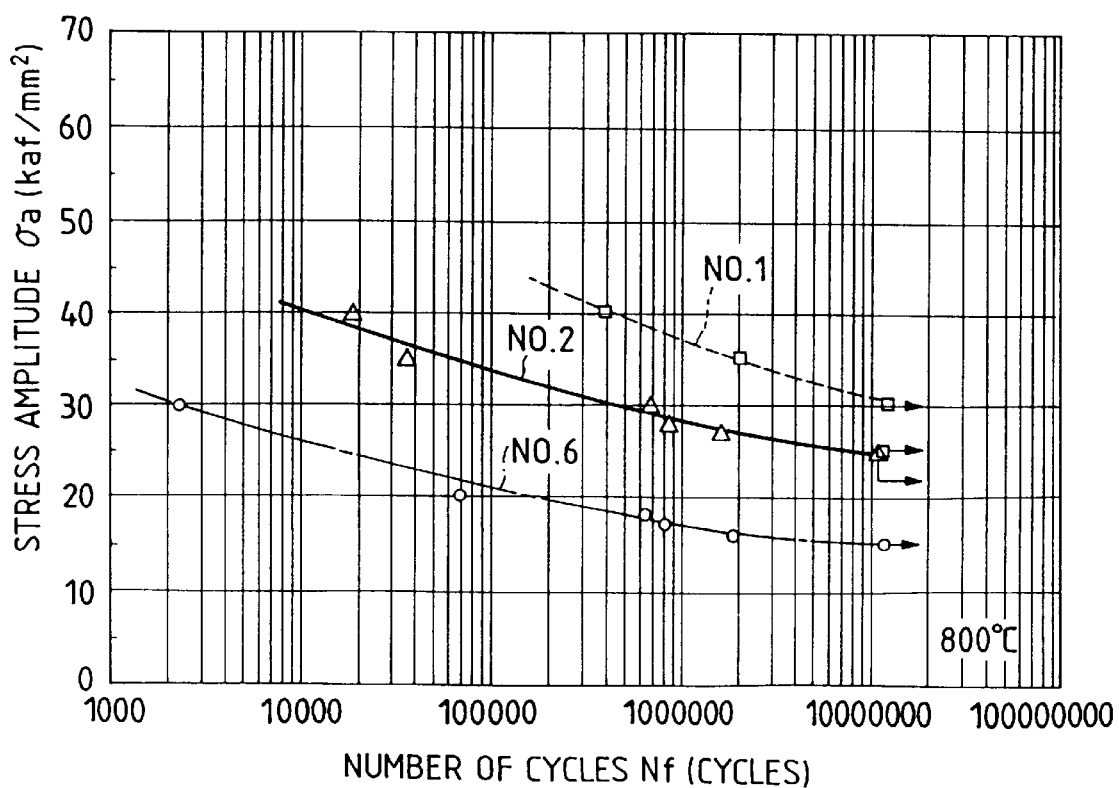
FIG. 13 is a diagram showing a relation between stress amplitude and repetition number at which rupture takes place.

FIG. 13 is a diagram showing rotary bending fatigue test results at 800° C. The forged material No.1 has a high value in high cycle fatigue strength. However casting material has large grain size, which results in the high cycle fatigue strength being low. In a practical combustor liner, it is about 3 kg/mm², however, the materials according to the present invention have about 15 kg/mm² or more, so that it is a sufficient value.

Embodiment 2

In the same manner as in the embodiment 1, alloys (wt %) shown in table 2 each are formed into a cylindrical body of the same size by centrifugal casting, and projections are formed on the outer surface by machining. Further, in this embodiment, solution treatment which heats at 1150° C. for 30 minutes and then cools by air is effected after casting. Grain size is 0.5–3 mm and any casting alloys have excellent creep rupture strength. Creep rupture strength of 850° C. and 10⁴ h as mechanical property is 3 kg/mm² or more. Particularly, an alloy including a lot of W of 10% or more was confirmed to present excellent strength of 5 kg/mm² or more.

TABLE 2

| No. | C | Si | Mn | Cr | W | Co | Al | Ti | Nb | Mg | B | Other | Ni |
|---|---|---|---|---|---|---|---|---|---|---|---|---|---|
| 7 | 0.08 | 0.29 | 0.66 | 21.3 | 0.7 | 1.2 | — | — | — | — | 0.001 | Mo 8.9, Fe 18.5 | 48.37 |
| 8 | 0.07 | 0.10 | 0.01 | 21.9 | 15.1 | 0.1 | 0.1 | 1.9 | — | 0.02 | 0.003 | Zr 0.01 | 60.69 |
| 9 | 0.07 | 0.26 | 0.20 | 21.9 | 15.2 | 14.6 | 0.5 | 0.5 | 0.5 | 0.02 | 0.006 | — | 46.25 |
| 10 | 0.07 | 0.25 | 0.22 | 22.1 | 15.0 | 29.6 | 0.5 | 0.5 | 0.5 | 0.02 | 0.004 | — | 31.24 |
| 11 | 0.06 | 0.37 | 0.68 | 21.9 | 15.2 | 39.9 | 0.1 | 0.1 | — | 0.02 | 0.002 | misch metal (0.25) | 20.88 |
| 12 | 0.06 | 0.25 | 0.72 | 28.3 | 10.8 | 0.1 | 0.4 | 0.9 | — | 0.02 | 0.003 | — | 58.45 |
| 13 | 0.06 | 0.28 | 0.65 | 15.2 | 23.7 | 0.1 | 0.5 | 1.0 | — | 0.02 | 0.004 | - | 58.48 |
| 14 | 0.07 | 0.32 | 0.68 | 22.0 | 15.5 | 29.8 | 0.8 | 1.5 | — | — | 0.003 | La 0.07 | 29.39 |

( ) expresses a mixed amount

Embodiment 3

Figure 14:
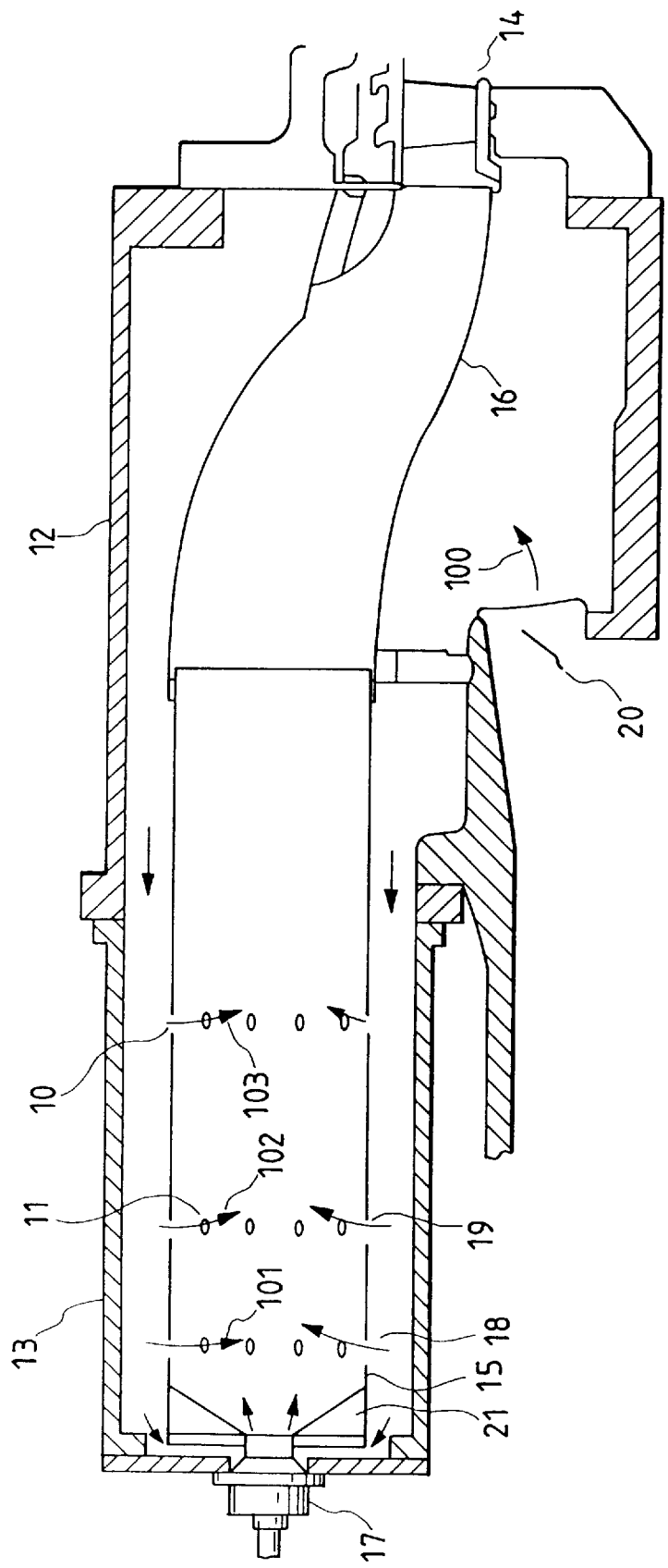
FIG. 14 is a sectional view of a gas turbine combustor.

FIG. 14 is a sectional view of a gas turbine combustor, using No.2 and No.5 alloys of the embodiment 1.

A combustor outer cylinder 13 is connected to one side of a casing 12 having an air inlet 20 for introducing thereinto air compressed at a compression ratio of 15–20 by an air compressor (not shown) and raised to a temperature of 350–450° C., as shown in the figure, and a turbine 14 is connected to the other side of the casing 12. In the inner side of the combustion outer cylinder 13 and the casing 12, a combustor liner 15 and a transition piece 16 connecting the combustion liner 15 and the turbine 14 are arranged. Here, the combustor liner 15 is provided with a fuel nozzle 17 and combustion primary air holes 18, combustion secondary air holes 19, dilution air holes 10 and cooling air holes 11 of louvers or slits, in a wall surface thereof in the axial direction. By this construction, compressor discharge air 100 from the air introduction inlet 20 cools, first, the outer periphery of the transition piece 16 by convection heat transfer, and then passes through an annular space defined by the combustor outer cylinder 13 and the combustor liner 15, flows toward an upstream side of the combustor at which the fuel nozzle is positioned. A part of the air 100 flows in the combustor liner 15 as the primary combustion air and the secondary combustion air and the other part flows in as cooling air. That is, the cooling air 101, 102 and 103 flowing out in parallel with and along the wall surface of the combustor liner 15 from the cooling holes 11 mixes with combustion gas flowing inside the combustor liner 15 to form a mixture layer, but it does not effect cooling of the wall surface of the combustor liner 15. On the other hand, in the portion contacting with the wall surface of the combustor liner 15, temperature boundary layer by convection heat transfer develops as it goes downstream of the cooling air holes 11. As a result, the cooling effect tends to lower as the cooling position goes more downstream than the cooling air holes 11. Decrease in the cooling effect causes elevation of wall surface temperature of the combustor liner 15, so that the cooling air holes 11 are provided intermittently in small pitches as shown in the figure in order to suppress the temperature elevation within an allowable temperature. The cooling air 101, 102, 103 is suppressed to an amount of 20% or less of the compressor discharge air 100 because of demand to make gas turbine inlet temperature uniform. The wall surface temperature of the combustor liner 15 when a combustion gas temperature is 1400° C. or more reaches to about 800° C. in a flame generation zone in which a radiation heat transfer amount is largest.

Further, an ingot is cast with No.13 alloy in table 2, and made into a rolled plate by hot rolling. The rolled plate is subjected to solution treatment and a plate of thickness of 2 mm is obtained. Using this plate, a transition piece 16 and a nozzle cap 21 each are formed in a predetermined shape by cold bending. Each of them is joined by welding. The welding is effected using welding wire of No.13 alloy which is the same composition as the base material. The welding is abutment tungsten inert gas welding (TIG). After welding, they each are heated at a temperature of 1150° C. and held for 30 minutes and then cooled with air and stress relief is effected.

By applying the gas turbine combustor manufactured as mentioned above to a practical machine of light oil combustion, it is apparent that the machine life is longer than a machine using conventional alloy and it is possible to raise gas temperature, since the combustor uses alloy excellent in thermal fatigue resistance.

Embodiment 4

Figure 15:
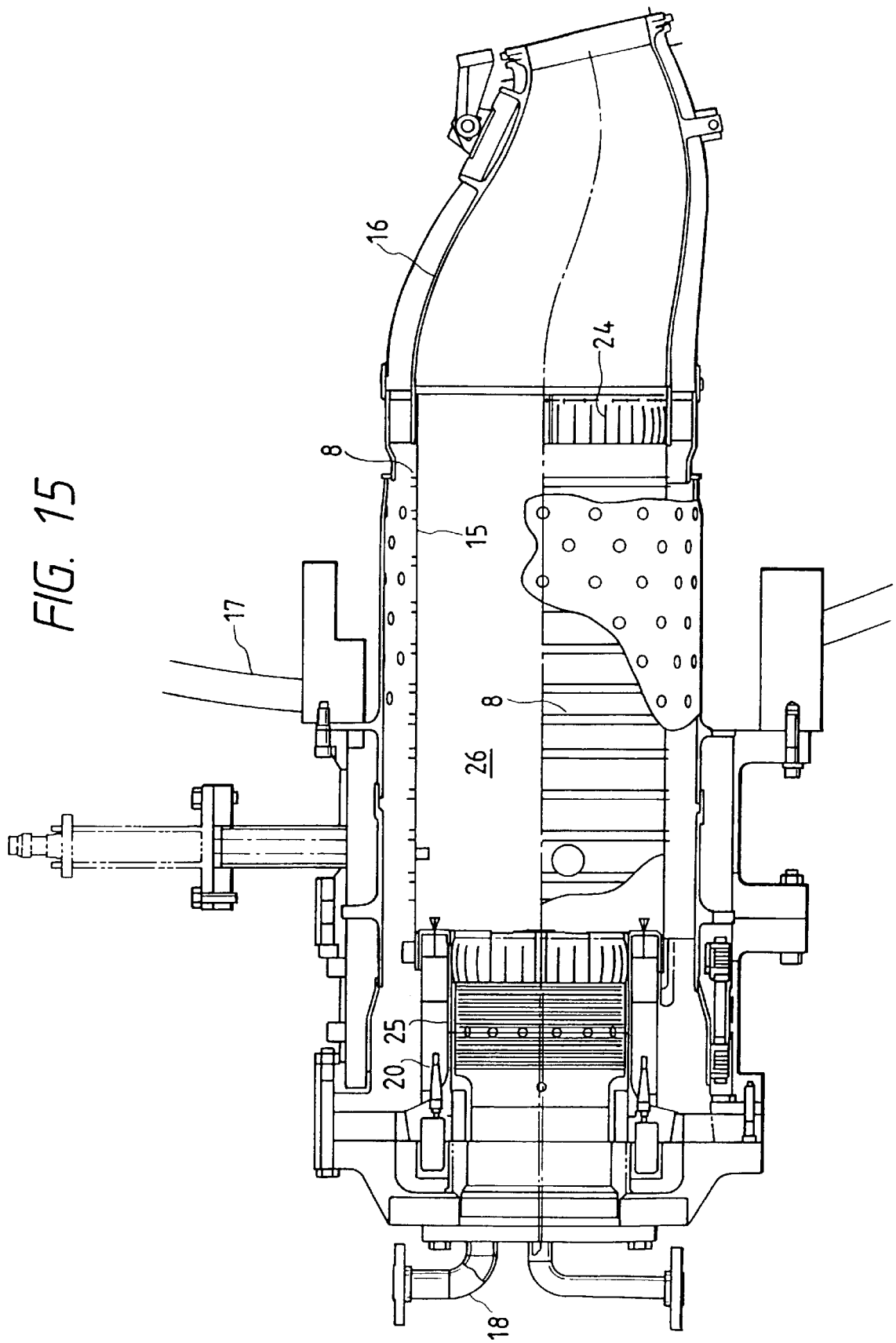
FIG. 15 is a sectional view of a gas turbine combustor.

FIG. 15 shows a part of another gas turbine including a low NOx type combustor according to the present invention. A typical combustor has a plurality of combustors which are arranged along the periphery of the gas turbine at an interval therebetween and each of which has a circular cross-section. The gas turbine has a compressor for supplying high pressure air for combustion and cooling. During operation of the gas turbine, the combustors burn fuel with high pressure air from the compressor to impart energy to the air. A part of the energy of high temperature gas produced in the combustor in this way reaches a first stage nozzle and turbine moving blades through a transition piece 16. The turbine moving blades drive the compressor and a proper load. The low NOx type combustor is enclosed by a combustor liner 15 fixed to a turbine casing 17. Fuel is supplied to the combustor through fuel piping 18. The fuel is introduced into the interior of the combustor by proper fuel introduction means 20. The fuel introduction means 20 is a fuel nozzle for gas or liquid fuel. A plurality of the fuel nozzles 20 are used.

This example includes a sub combustion chamber 25 and a main combustion chamber 26, an upstream end of the main chamber 26 is connected to a downstream end of the sub chamber 25 by a throat region of a relatively small cross section.

The combustion chambers 25 and 26 are preferable to be circular in cross section. In this embodiment, the combustor liner 15 defining the combustion chambers 25, 26 and the transition piece 16 connected to the combustion liner by a spring ring 24 use Fe base heat resisting alloy of No.6 of embodiment 1. The combustion liner 15 is produced by centrifugal casting and the transition piece 16 is cast by a vacuum suction method in which a lost wax type mould is used and molten metal is sucked up from a lower portion of the mould. The cast member of the combustor liner 15 is uniform in thickness.

Air of 350–450° C. compressed by the compressor in the same manner as in the embodiments 1–3 is used for cooling the combustor liner 15, and the combustor liner 15 is cooled through ring-shaped projections 8 provided on the outer surface by machining.

For cooling the combustor liner it is preferable to use air film cooling utilizing louvers or slots.

In this embodiment, the castings, each as it is cast, are used and it is possible to effect solution treatment at 1100–1175° C. After the solution treatment, it is possible to effect aging treatment at a temperature of 950–1000° C.

In this embodiment, the inner peripheral surface of the combustor liner 15 is flat. Upon centrifugal casting, a lot of non-metallic foreign matters are formed or gathered in the inner peripheral surface, so that the inner peripheral surface is machined. The characteristics in this embodiment are the same as in the embodiment 1. In this embodiment, also, the combustor is cooled so that metal temperature of the combustor liner becomes 800° C. or more when the combustion gas temperature is 1400° C. or more, and it has such a cooling construction as to effect such cooling.

Embodiment 5

Figure 16:
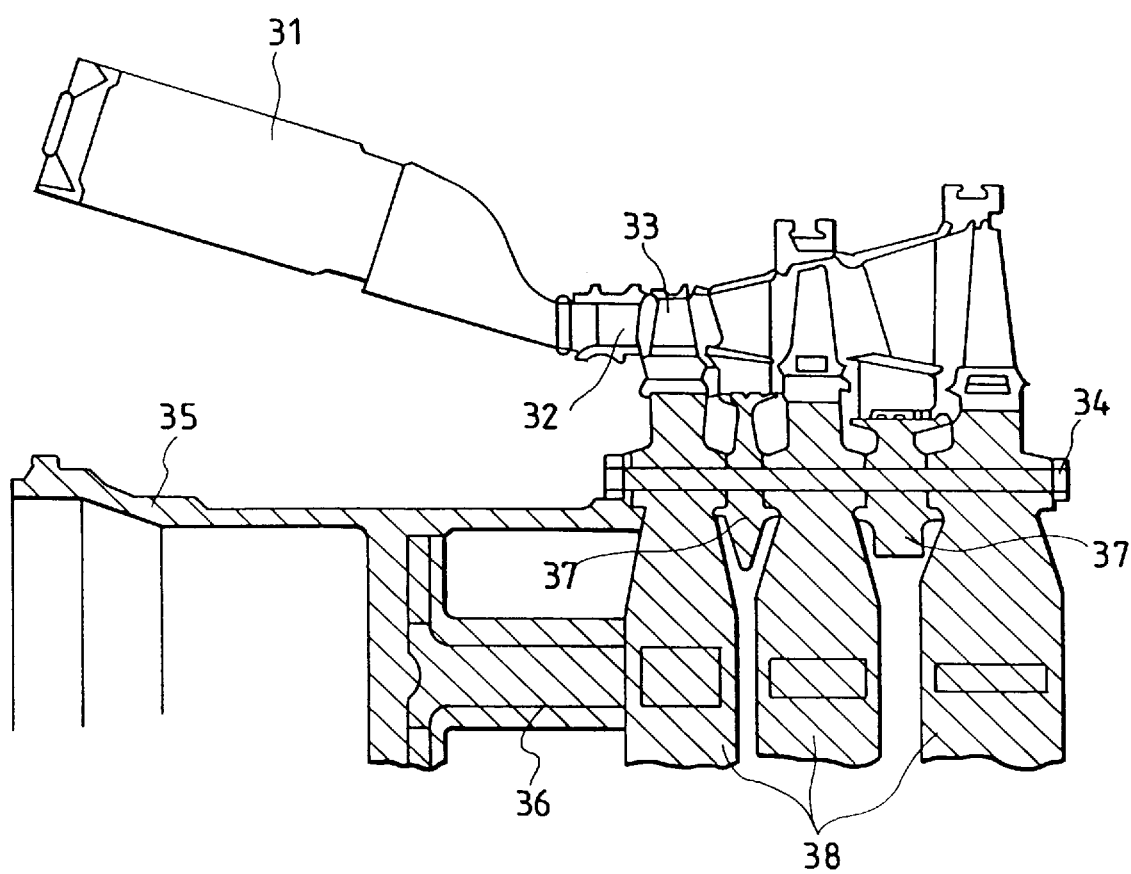
FIG. 16 is a sectional view of a turbine section of a gas turbine.

FIG. 16 is a sectional view of a rotating portion of the gas turbine which is provided in the embodiments 1–4 and in which combustion gas inlet temperature to a first stage is 1400° C. or more. In FIG. 16, number 31 denotes the combustor, 32 gas turbine nozzles, 33 gas turbine moving blades, 34 turbine stacking bolts, 35 distance piece, 36 inducer, 37 turbine spacers and 38 turbine discs. The turbine nozzles 32 and the turbine blades 33 are for three stages.

In this embodiment, all the inner peripheral surfaces of the combustion liner and the transition piece are coated with ceramics by thermal spraying for thermal insulation.

In any of them, the inner peripheral surface is washed for degreasing, subjected to blasting using steel grids, and then plasma spraying is effected to form an alloy coating layer comprising, by weight, 10% Ni, 25% Cr, 7% Al, 0.6% Y, 5% Ta and the balance Co. The plasma spraying is effected in Ar with a pressure of 200 Torr. In this case, oxygen partial pressure in the atmosphere in which the plasma spraying is done is measured by an oxygen sensor. The partial pressure is 10 atg or less. The output of the plasma is 40 kW. Immediately after the Co—Ni—Cr—Al—Y alloy coating layer of thickness 0.01 mm is formed under such a condition, a coating layer of $ZrO_2$—8% $Y_2O_3$ is formed on the above-mentioned joining (alloy) layer. This plasma spraying condition is plasma output 50 kW, and spraying in air. The thickness of the coating layer of $ZrO_2$—8% $Y_2O_3$ is 0.3 mm. After that, heat treatment of 1060° C. for 10 hours is carried out to effect diffusion treatment of the alloy coating layer and the base material.

From the members formed in this way, test pieces for a heat cycle test are taken. In the repeated heat cycle tests they are held at 750° C. for 15 minutes and held in water of 20–25° C. for 15 seconds. In the present embodiment, separation of the thermal barrier coating layer in any test pieces did not occur even at 1700 repetitions. By providing such a thermal barrier coating, metal temperature of the combustion liner and the transition piece can be reduced by 50–100° C., whereby it is possible to make the combustion gas temperature higher and an amount of cooling air smaller, so that thermal efficiency can be raised to higher efficiency.

The gas turbine relating to the present embodiment has the following construction:

At least one kind of a distant piece, a turbine spacer, turbine stacking bolts, compressor stacking bolts and at least a final stage compressor disc in addition to a compressor rotor can be made of heat resisting alloy comprising by weight 0.05–0.2% C, at most 0.5% Si, at most 1% Mn, 8–13% Cr, at most 3% Ni, 1.5–3% Mo, 0.05–0.3% V, 0.02–0.2% Nb, 0.02–0.1% N and balance Fe and having all tempered martensite structure. By making all of the parts with the heat resistance alloy, combustion gas temperature can be made higher, and thermal efficiency can be improved. In particular, when at least one kind of the parts is made of heat resistance alloy comprising by weight 0.05–0.2% C, at most 0.5% Si, at most 0.6% Mn, 8–13% Cr, 2–3% Ni, 1.5–3% Mo, 0.05–0.3% V, 0.02–0.2% Nb, 0.02–0.1% N and balance Fe, being a ratio Mn/Ni of at most 0.11, particularly, 0.04–0.01, or the alloy in which Si is at most 0.1% and Mn is at most 0.1% and having fully tempered martensite structure, high embrittlement resistance property can be obtained and high safety gas turbine can be obtained.

Further, as material used in those parts, martensitic steel having 450° C. $10^5$ h creep rupture strength of 40 kg/mm$^2$ or more and 20° C. V-notch Charpy impact value of 5 kg-m/cm$^2$ or more is used. Particularly preferable is material in which 450° C. $10^5$ h creep rupture strength is 50 kg/mm$^2$ or more and 20° C. V-notch Charpy impact value after heating at 500° C. for $10^5$ h is 5 kg-m/cm$^2$ or more.

Those materials each can include further at least one kind selected from a group consisting of at most 1% W, at most 0.5% Co, at most 0.5% Cu, at most 0.01% B, at most 0.5% Ti, at most 0.3% Al, at most 0.1% Zr, at most 0.1% Hf, at most 0.01% Ca, at most 0.01% Mg, at most 0.01% Y, and at most 0.01% rare earth element.

First stage turbine nozzle portions of turbine nozzles fixed to a diaphragm each are made of casting alloy comprising by weight at most 0.05% C, at most 1% Si, at most 2% Mn, 16–22% Cr, 8–15% Ni and balance Fe, and the other turbine nozzle portions are made of high C-high Ni steel casting alloy.

For the turbine blades, casting alloy is used which comprises by weight 0.07–0.25% C, at most 1% Si at most 1% Mn, 12–20% Cr, 5–15% Co, 1.0–5.0% Mo, 1.0–5.0% W, 0.005–0.03% B, 2.0–7.0% Ti, 3.0–7.0% Al, at least one kind of selected from a group consisting of at most 1.5% Nb, 0.01–0.5% Zr, 0.01–0.5% Hf and 0.01–0.5%, and balance Ni, and having γ' phase and γ" phase precipitated in austenitic phase matrix. In particular, under a higher temperature condition in which a combustion gas inlet temperature is 1500° C. or higher, for first stage blades, alloy further including at most 5% Re, being monocrystal at a blade portion and columnar crystal at a dovetail, or monocrystal as whole, a dispersed alloy in which at most 1 wt % $Y_2O_3$ of particle size 0.1 μm or less is dispersed uniformly, unidirectional solidification alloy, etc. is used. For the alloy which is monocrystal at the blade portion, it is preferable not to include Si and Mn and to include at most 0.05% of each of C and B, at most 0.5% Ti and 2–10% Ta. The above-mentioned alloy is used for second stage and lower stages.

The last mentioned Ni base superalloy is used for 1400° C. class gas turbine nozzles at least at first stage, however, it can be used for gas turbine nozzles at all the stages. Nozzles other than the first stage nozzles each are made of casting alloy comprising by weight 0.20–0.60% C, at most 2% Si, at most 2% Mn, 25–35% Cr, 5–15% Ni, 3–10% W, 0.003–0.03% B and balance Co, or further including at least one kind of 0.1–0.3% Ti, 0.1–0.5% Nb and 0.1–0.3% Zr, and including eutectic carbides and secondary carbides in austenitic phase matrix. Any of those alloys are subjected to aging treatment after solution treatment to form the above-mentioned precipitation substances and be strengthened.

As members for the above-mentioned first stage, preferable is Ni base alloy having a specific composition, in which rupture time in creep rupture strength test at 900° C. and 14 kg/mm$^2$ is 300 h or more, thermal fatigue resistance between 900° C. and 350° C. is 600 times or more of frequency number at which no crack occurs, and welding is possible at a preheating temperature of 400° C. or less. The member has a blade portion and side walls formed at both ends of the blade portion, is arranged in a ring configuration on an outer periphery of said rotating blade, and the material is preferable to be Ni base alloy comprising by weight 0.05–0.20% C, 15–25% Co, 15–25% Cr, 1.0–3.0% Al, 1.0–3.0% Ti, 1.0–3.0% Nb, 5–10% W and at lest 55% Ni, the contents of (Al+Ti) and W being within a line connecting A (5% of Al+Ti, 7.5% W), B (3% of Al+Ti, 10% W), C(5% of Al+Ti, 7.5% W), D(5% of Al+Ti, 5% W), E(5% of Al+Ti, 5% W) and F(2.5% of Al+Ti, 7.5% W) in turn.

Further, the turbine nozzle is preferable to be Ni base alloy in which rupture time at 900° C. and 14 kg/mm$^2$ is 300 h or more and preheating temperature is 400° C. or less at which no crack occurs within a beat formed by TIG welding one pass of length 80 mm width 8 mm.

A gas turbine according to the present invention is preferable to be a casting of Ni base alloy in which 70 mm or more is between the side walls at the both ends of the above-mentioned nozzle and the length from the combustion gas inlet side to the outlet side is 100 mm or more. Further, for 1500° C. class gas turbine nozzles, the above-mentioned Co bas alloy is preferable for the first stage, the above-mentioned Ni base alloy further including therein at most 2% Ta and at most 0.15% B is preferable for the second stage and the other stages.

Further, the turbine blades can be subjected to diffusion coating of Al, Cr, or Al+Cr in order to prevent corrosion by high temperature combustion gas. The coating layer thickness is 30–150 μm, and it is preferable to provide it at the blade portions contacting with the gas. It also is preferable to form stable $ZrO_2$ layer as thermal barrier layer by gas phase or plasma spraying after gas phase or plasma spraying of Ni or Fe alloy containing 10–30% Cr, 5–10% Al and at most 1% Y, instead of the diffusion coating.

A plurality of the combustors are arranged on the circumference of the gas turbine. Each of the combustors is constructed in a double structure of the outer cylinder and inner cylinder combustor liner. The combustor liner and the transition piece are as previously described on the above.

The compressor rotor is a split type of 7 split structures in which 1st and 2nd stage blades are planted or mounted in a portion a, 3rd and 4th stage blades in a portion b, 5th and 6th stage blades in a portion c, 7th and 8th stage blades in a portion d, 9th, 10th and 11th stage blades in a portion e, 12th to 14th stage blades in a portion f and 15th to 17th stage blades in a portion g, and they are connected to one unit by bolts 19. Each rotor is connected by bolts between planting portions of the 2nd stage blades and the final stage blades, and connected to the distance piece 35. Any bolts are made of heat resisting alloy and ten bolts or more in total are used at the whole periphery. The rotors a to e are used at a temperature of 350° C. or less, so that high temperature strength (creep rupture strength) is not required, but it is required to be high in low temperature toughness. In particular, the rotor a is provided with a bearing portion and long blades are planted therein, so that the rotor receives the largest centrifugal stress and is used at a lowest temperature (35° C.). Therefore, highest low-temperature toughness is required for the rotor a. On the other hand, since the rotors f and g are exposed to the highest temperature ($\leq$400° C.), high creep rupture strength and excellent oxidation resistance are required. Therefore, the above-mentioned low alloy steel is used.

The above construction makes it possible that the compression ratio is 15–18, temperature is 400–500° C., compression efficiency is 86% or more, gas temperature at the first stage turbine nozzle inlet is 1400° C. or more and exhaust gas temperature is 530° C. or more. Thermal efficiency of 35% or more can be attained. The above-mentioned heat resisting alloy of high creep rupture strength and small heat embrittlement is used for the turbine discs, the distant piece, the spacer, the compressor rotor shaft and the stacking bolts. The turbine blades each are made of a casting which has high-temperature strength and high-temperature ductility, and the combustor liner is made of a casting of a high-temperature strength and a high fatigue strength. Therefore, a gas turbine which is high in reliability and well-balanced in total can be attained. As fuel to be used, natural gas or light oil is used.

Further, by using Ni base mono-crystal alloy for the first stage turbine blades, such a power plant gas turbine can be achieved that gas inlet temperature to the first stage turbine nozzles is 1500° C., first stage blade metal temperature is 1000° C., gas turbine exhaust gas temperature is 650° C. and power generation efficiency expressed by LHV is 34% or more.

Embodiment 6

Figure 17:
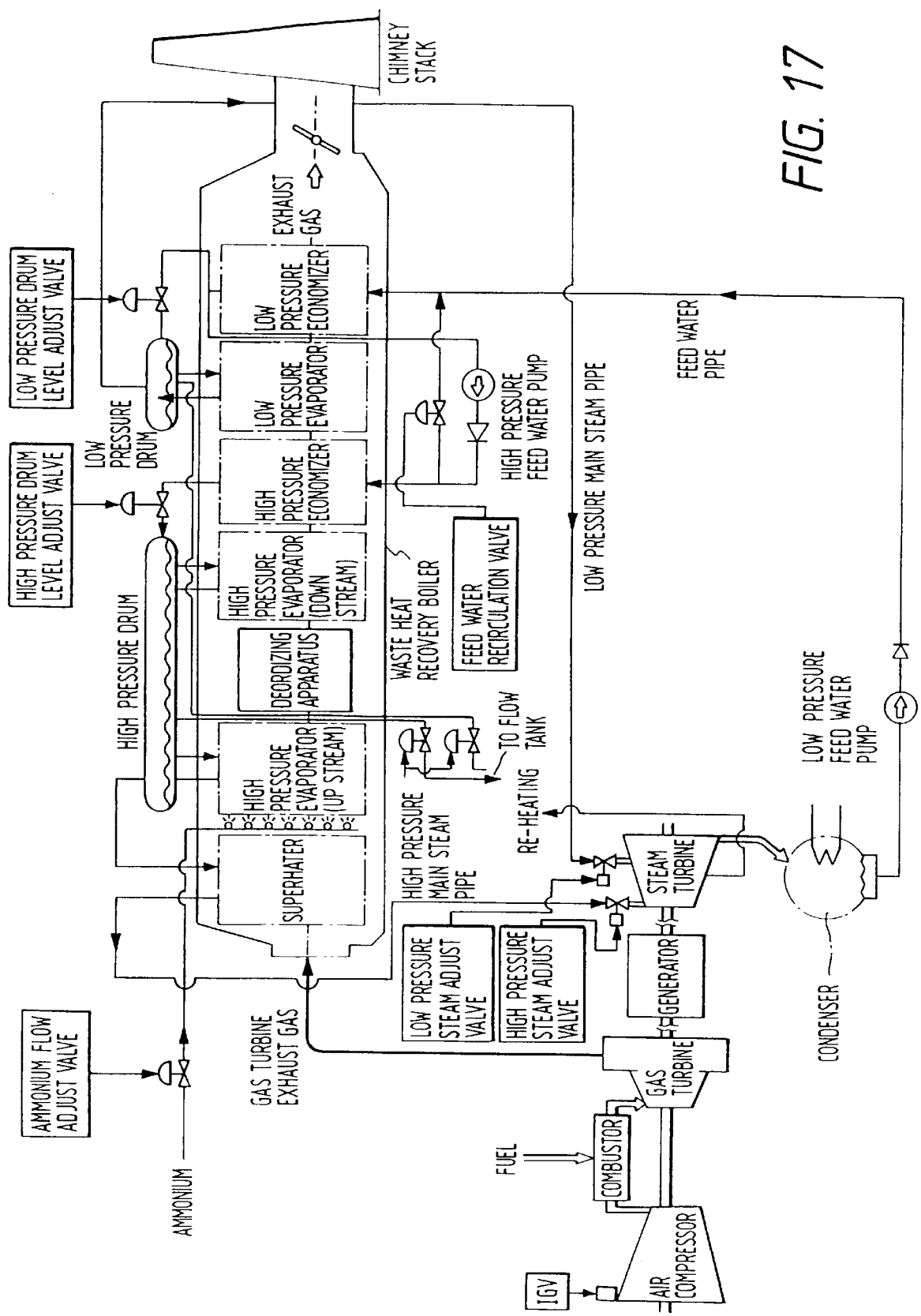
FIG. 17 is a schematic diagram of a combined cycle power plant according to the present invention.

FIG. 17 is a schematic diagram showing a uni-axial combined cycle power generation system using the gas turbine of the embodiment 5 and a high and low pressure section integrated steam turbine. A plurality of pairs of the gas turbine and the steam turbine can be used for power generation and 3 or 6 of the gas turbines and 3 or 6 of the steam turbines can be combined.

In case of power generation utilizing the gas turbine, in recent years a so-called combined cycle power generation system tends to be used in which the gas turbine is driven by using liquefied natural gas (LNG), a steam turbine is driven by steam obtained by recovering exhaust gas energy of the gas turbine and a generator is driven by both the gas turbine and the steam turbine. When the combined cycle power generation system is used, the thermal efficiency can be largely improved to 46% or more, compared with the thermal efficiency of 40% in power generation by a conventional single steam turbine.

First, air passes through a suction air filter and a suction air silencer and enters an air compressor which compresses the air to delivery compressed air of 350–450° C. to a low NOx combustor.

In the combustor, fuel is injected into the compressed air to be burnt to produce high temperature gas of 1400° C. or more. The high temperature gas works in the gas turbine to generate power.

Combustion exhaust gas of 550° C. or more, exhausted from the gas turbine is delivered to a waste heat recovery boiler through an exhaust gas silencer to recover thermal energy to produce high pressure steam of 530° C. or more and low pressure steam, both of which are sent to a steam turbine through high pressure steam piping and low pressure steam piping, respectively. The boiler is provided with a denitration apparatus of dry ammonium contact reduction. The exhaust gas is exhausted from a chimney stack which is a tripod type and is several meters high.

The high and low pressure section integrated steam turbine can improve single machine output per single turbine by raising steam pressure at a main steam inlet portion to 100 atg or more and the temperature to 530° C. or more. In order to increase the single machine output, it is necessary to increase the length of a final stage moving blade and increase a flow rate of steam. In the present embodiment, when the blade length of the final stage blade is made 30 inches or more, particularly, 33.5 inches, annulus area increases to 1.7 times that of the 26 inch blade length. Therefore, the output increases from 100 MW in the conventional machine to 1700 MW and when it is made 40 inch, the single output can be increased to 2 times or more.

To provide high output in this way, rotor material is necessary which has such an excellent property as is the same as Cr—Mo—V steel in a high temperature region and as Ni—Cr—Mo—V steel in a low temperature region. In a case where long blade length of 30 to 40 inches class is used, since stress ratio becomes 1.7 as mentioned above, material having tensile strength of 88 kg/mm$^2$ or more is necessary. Further, as a high and low pressure section integrated steam turbine rotor material, material is necessary in which 538° C. 10$^5$ h creep rupture strength is 15 kg/mm or more in view of security of safety against high temperature rupture at a high temperature side and impact absorption energy at room temperature is 2.5 kg-m (3 kg-m/cm$^2$) or more in view of security of safety against rupture at a low temperature side.

The steam turbine according to the present invention is provided with blades of 15 stages which are planted on a high and low pressure section integrated rotor shaft. High pressure, high temperature steam of 538° C., 126 atg is flowed into a high pressure section from a steam inlet through a steam control valve. The steam entered the high pressure section becomes 367° C. 38 atg and goes out. The steam is reheated to 538° C. 35 atg by a reheater of the waste heat recovery boiler and passes through a low pressure section of the rotor to become steam of 46° C. 0.1 atg which is exhausted from an outlet into a condenser.

Since the high and low pressure section integrated rotor shaft according to the present embodiment is exposed to steam of 538° C. to 46° C., forged steel of Ni—Cr—Mo—V low alloy steel having properties of FATT 60° C. or less, 538° C. 10$^5$ strength 11 kg/mm$^2$ or more is used. Blade planting portions of the rotor shaft are made into disc-shape which is formed by machining. The shorter the blade length is, the longer the length of the disc portion becomes, whereby vibration is reduced.

In forming of the rotor shaft according to the present embodiment, an ingot is produced by electroslag re-melting, and subjected to hot forging to make it into a shaft of diameter 1.2 m. The shaft is heated at temperature 950° C. for 10 hours, and then cooled by water spraying while being rotated so that a central portion thereof is cooled at 100° C./h. Then tempering of heating at temperature of 665° C. for 40 h is effected.

(1) A high and low pressure section integrated rotor shaft:

In this embodiment, as material for this shaft, Ni—Cr—Mo—V low alloy steel can be used which comprises by weight 0.15– 0.40% C, at most 0.1% Si at most 0.5% Mn, 1.5–2.5% Ni, 0.8–2.5% Cr, 0.8–2.0% Mo, 0.1–0.35% V, having full bainitic structure. In particular, it is preferable that a ratio of Mn/Ni is 0.12 or less, or a ratio of (Si+Mn)/Ni is 0.18 or less, and it is preferable for a ratio of (V+Mo)/(Ni+Cr) to be 0.45–0.70. Further, this low alloy steel can further include at least one kind of at most 0.04% rare earth element, at most 0.04% Mg, 0.04% Ca, at most 0.2% Hf, 0.2% Zr and at most 1% W. In particular, alloy steel is preferable which comprises by weight 0.20–0.28% C, at most 0.1% Si, 0.5–0.25% Mn, 1.6–2.0% Ni, 1.7–2.3% Cr, 1.0–1.5% Mo and 0.20–0.30% V.

(2) Blade (compressor, steam turbine):

The length of 3 stages at the compressor outlet side and the length of 3 stages at a high temperature high pressure side of the steam turbine each are about 40 mm. They are made of martensitic forged steel comprising by weight 0.20–0.30% C, 10–13% Cr, 0.5–1.5% Mo, 0.5–1.5% W, 0.1–0.3% V, at most 0.5% Si, at most 1% Mn and the balance Fe.

A middle pressure section of the steam turbine becomes longer toward the low pressure side, and is made of martensitic forged steel comprising by weight 0.05–0.15% C, at most 1% Mn, at most 0.5% Si, 10–13% Cr, at most 0.5% Mo, at most 0.5% Ni and the balance Fe.

As the first stage of the compressor or the final stage of the steam turbine, about 90 blades are provided, each of which is 33.5 inch long, and made of forged steel of martensitic steel comprising by weight 0.08–0.15% C, at most 1% Mn, at most 0.5% Si, 10–13% Cr, 1.5–3.5% Ni, 1–2% Mo, 0.2–0.5% V, 0.02–0.08% N and balance Fe. Further, in the final stage, the tip portion of a shield plate of stellite is mounted on a leading edge portion by welding for prevention of erosion. Partial hardening is effected to the blade other than the shield plate. Further, for long blades longer than 40 inch of the first stage of the compressor or the final stage of the steam turbine, Ti blades are used which include 5–8% Al and 3–6% V.

In the steam turbine blades, 4–5 blades of each stage are fixed by a shroud of the same material as the blades through pinching projections and tenons provided at the tips of the blades.

For blades used at 3000 rpm, even where the length is 40 inch, the 12% Cr alloy steel is used, and for blades which are 40 inch long and used at 3600 rpm, Ti alloy is used, but for the blades where length is up to 33.5 inch, the 12% Cr alloy steel is used.

(3) For static blades of a compressor and nozzles of a steam turbine:

13% Cr ferritic stainless steel is used. For nozzles of steam turbine, martensitic steel having the same composition as the nozzles is used until the 3rd stage at a high pressure side. However, for the other nozzles, the same material is used as the blades of the middle pressure section.

(4) For steam turbine casing, Cr-Mo-V casting steel is used, which comprises by weight 0.15–0.3% C, at most 0.5% Si, at most 1% Mn, 1–2% Cr, 0.5–1.5% Mo, 0.05–0.2% V and at most 0.1% Ti. It drives a generator, for example, where a power of 100,000–200,000 kW can be generated by the generator. In the present embodiment, distance between the bearings of the rotor shaft is 520 cm, an outer diameter of blades of the final stage is 315 cm, a ratio of the distance to the diameter is 1.65. Power generation capacity is possible to be 100,000 kW. The distance between the bearings of the rotor shaft is 0.52 m per power generation output of 10,000 kW.

Further, in the present embodiment, in a case where 40 inch blades are used as blades of the final stage, the outer diameter is 365 cm, a ratio of distance between bearings of the shaft to the outer diameter is 1.43, whereby power generation output of 200,000 kW is possible, and the distance per 10,000 kW is 0.26 m.

In the present embodiment, a steam turbine, particularly, a high and low pressure section integrated steam turbine, comprising a rotor having blades planted on a rotor shaft in multi-stage from a high pressure side to a low pressure side, the rotor shaft is made of heat resisting low alloy steel containing Ni—Cr—Mo—V and having bainitic structure, and the rotor shaft is made of one piece from a high pressure side in which steam of 538 or 556° C. is introduced into the first stage blades to a low pressure side in which steam 46° C. or less is exhausted at the final stage blades.

Further, the rotor shaft is made of heat resisting low alloy steel containing Ni—Cr—Mo—V and having bainitic structure, and the rotor shaft is made of one piece from a high pressure side in which steam of 530° C. or more is introduced into the first stage blades to a low pressure side in which steam of 100° C. or less is exhausted at the final stage blades, the final stage blades have blade length of 33.5 inch or 40 inch, and a shaft portion from the first stage to 33.5 inch is made of martensitic steel including 10–13% Cr and the 40 inch blades are made of Ti base alloy including by weight 4–8% Al and 2.5–5.5% V.

As steam turbines concerning the present invention, there are a non-reheating type turbine of single flow type in which steam of 530° C. flows one way from a high pressure side to a low pressure side of steam temperature 100° C. or less, and a reheating type steam turbine in which the steam is reheated to the same temperature as in the high pressure side and flowed into a middle pressure side. It is preferable for blades to be 10 stages or more and it is preferable for the blade length to be 30 inches or more at the final stage.

In the present invention, steam of 566° C. can be used and a steam pressure of 121, 169 and 224 atg also can be used.

Although a uni-axis type combined cycle power generation plant of a combination of 6 groups, each of which comprises a gas turbine, a waste heat recovery boiler, a steam turbine and a generator was explained above, a multi-axis type combined cycle power generation plant also is applied in which a plurality of gas turbines are combined with waste heat recovery boilers to generate steam and one steam turbine is driven by the steam.

As for shearing ratio of power generation output, in the case of a uni-axial combined cycle power generation plant, the gas turbine bears $\frac{2}{3}$ of the total output and the steam turbine bears $\frac{1}{3}$. Further, the output of the gas turbine can be made 50,000 to 200,000 kW, and the steam turbine is made so that the output thereof is coped with the gas turbine output, from the above output.

Thermal efficiency can be raised by 2–3% as compared with conventional thermal power plants. Even in case of a partial load, by decreasing gas turbines in operation, the equipment in operation can be operated around a rated load, so that the plant was operated at a high efficiency of 46% or more as a whole. Further, an amount of $CO_2$ per unit power generation mount can be reduced and green house effect is reduced.

The combined cycle power plant is constructed of a gas turbine which is easy to start stop in a short time and a small sized simple steam turbine. Therefore, output can be easily adjusted and the plant is suitable as a middle load power plant which can respond to change in demand.

As mentioned above, according to the present invention, a gas turbine combustor which has no welding portion in an axial portion and excellent thermal fatigue resistance and long life can be obtained. Further, endurance temperature of the combustor liner and the transition piece can be raised, whereby thermal efficiency can be raised.

The present invention can be used for gas turbine combustors for power generation, air crafts, vehicles, drive and marine applications.

What is claimed is:

1. A gas turbine combustor having a cylindrical liner in which combustion gas is produced and a transition piece for leading the combustion gas to a gas turbine, wherein said cylindrical liner is made of austenitic Fe base casting alloy, Ni base casting alloy or Co base casting alloy, said casting alloy having an average crystal grain diameter of 500 $\mu$m or more.

2. A gas turbine combustor according to claim 1, wherein said Fe base casting alloy is austenitic steel comprising, by weight, 0.04–1.0% C, at most 2% Si, at most 3% Mn, 15–35% Cr and 10–30% Ni.

3. A gas turbine combustor according to claim 1, wherein said Ni base casting alloy comprises, by weight, 0.04–0.5%

C, at most 1% Si, at most 2% Mn, 15–35% Cr, 15–40% Co, at most 10% of at least one kind of Mo and W, 0.1–10% Ti and 0.1–5% Al.

4. A gas turbine combustor as set forth in claim 1, wherein said Co-base casting alloy comprises, by weight, 0.04–1.0% C, at most 1% Si, at most 2% Mn, 15–35% Cr, 0.5–20% W and at most 30% Ni.

5. A gas turbine combustor according to claim 1, wherein an alloy layer and a ceramic layer are formed on an inner peripheral surface of a cylindrical portion of said combustor, exposed to combustion gas, said alloy layer being an alloy comprising at least one kind of Fe, Co and Ni as a main component, by weight, 10–30% Cr, 5–30% Al, 0.1–5% in total of one or two kinds of Hf, Ta, Y, Si, and Zr, and said ceramic layer being made of zirconia including by weight 5–10% in total of one or two kinds of calcium oxide, magnesium oxide and yttrium oxide.

6. gas turbine comprising a compressor, a combustor producing combustion gas using air compressed by the compressor and a gas turbine driven to rotate by the combustion gas, said combustor having a cylindrical liner in which combustion gas is produced and a transition piece for leading the combustion gas to a gas turbine, wherein said cylindrical liner is made of austenitic Fe base casting alloy, Ni base casting alloy or Co base casting alloy, said casting alloy having an average crystal grain diameter of 500 μm or more.

7. A gas turbine combustor having a cylindrical liner in which combustion gas is produced and a transition piece for leading the combustion gas to a gas turbine, wherein said cylindrical liner is made of a Co base casting alloy comprising by weight 0.04–1.0 C, at most 1% Si, at most 2% Mn, 15–35% Cr, 0.5–20% W, at most 30% Ni and 35–60% Co, and having an average crystal grain diameter of 500 μm or more.

8. A gas turbine comprising a compressor, a combustor producing combustion gas using air compressed by said compressor and a turbine driven to rotate by the combustion gas, said combustor having a cylindrical liner in which combustion gas is produced and a transition piece for leading the combustion gas to a gas turbine, wherein said cylindrical liner is made of austenitic Fe base casting alloy, Ni base casting allow or Co base casting alloy, said casting alloy having an average crystal grain diameter of 500 μm or more, and said cylindrical liner having cooling projections provided on an outer peripheral portion thereof.

9. A gas turbine comprising a compressor, a combustor producing combustion gas using air compressed by said compressor and a turbine driven to rotate by the combustion gas, said combustor having a cylindrical liner in which combustion gas is produced and a transition piece for leading the combustion gas to a gas turbine, wherein said cylindrical liner and said transition piece each are made of austenitic Fe base casting alloy, Ni base casting alloy or Co base casting alloy, said casting alloy having an average crystal grain diameter of 500 μm or more.

10. A combined cycle power generation system which comprises a gas turbine having a combustor producing combustion gas using compressed air compressed by a compressor and a turbine driven to rotate by the combustion gas, and a steam turbine driven to rotate by steam generated by a waste heat recovery boiler recovering the heat of exhaust combustion gas from said gas turbine, said combustor having a cylindrical liner in which combustion gas is produced and a transition piece for leading the combustion gas to a gas turbine, wherein said cylindrical liner is made of austenitic Fe base casting alloy, Ni base casting alloy or Co base casting alloy, said casting alloy having an average crystal grain diameter of 500 μm or more.

11. A combined cycle power generation system which comprises a gas turbine having a combustor producing combustion gas using compressed air compressed by a compressor and a turbine driven to rotate by the combustion gas, and a steam turbine driven to rotate by steam generated by a waste heat recovery boiler recovering the heat of exhaust combustion gas from said gas turbine, said combustor having a cylindrical liner in which combustion gas is produced and a transition piece for leading the combustion gas to a gas turbine, wherein said cylindrical liner and said transition piece each are made of austenitic Fe base casting alloy, Ni base casting alloy or Co base casting alloy, said casting alloy having an average crystal grain diameter of 500 μm or more.

12. A gas turbine combustor having a cylindrical liner in which combustion gas is produced and a transition piece for leading the combustion gas to a gas turbine, wherein said cylindrical liner is a casting produced by centrifugal casting of austenitic Fe base casting alloy or Co base casting alloy, and wherein said casting alloy has an average crystal grain diameter of 500 μm or more.

13. A gas turbine combustor having a cylindrical liner in which combustion gas is produced and a transition piece for leading the combustion gas to a gas turbine, wherein said cylindrical liner is a casting produced by centrifugal casting of austenitic Fe base casting alloy, Ni base casting alloy or Co base casting alloy, and wherein said Co base casting alloy comprises by weight 0.04–1.0% C, at most 1% Si, at most 2% Mn, 15–35% Cr, 0.5–20% W, at most 30% Ni and 35–60% Co and has an average crystal grain diameter of 500 μm or more.

* * * * *